A. G. MARANVILLE.
VALVE OPERATING MECHANISM.
APPLICATION FILED OCT. 16, 1919.
1,386,579.
Patented Aug. 2, 1921.
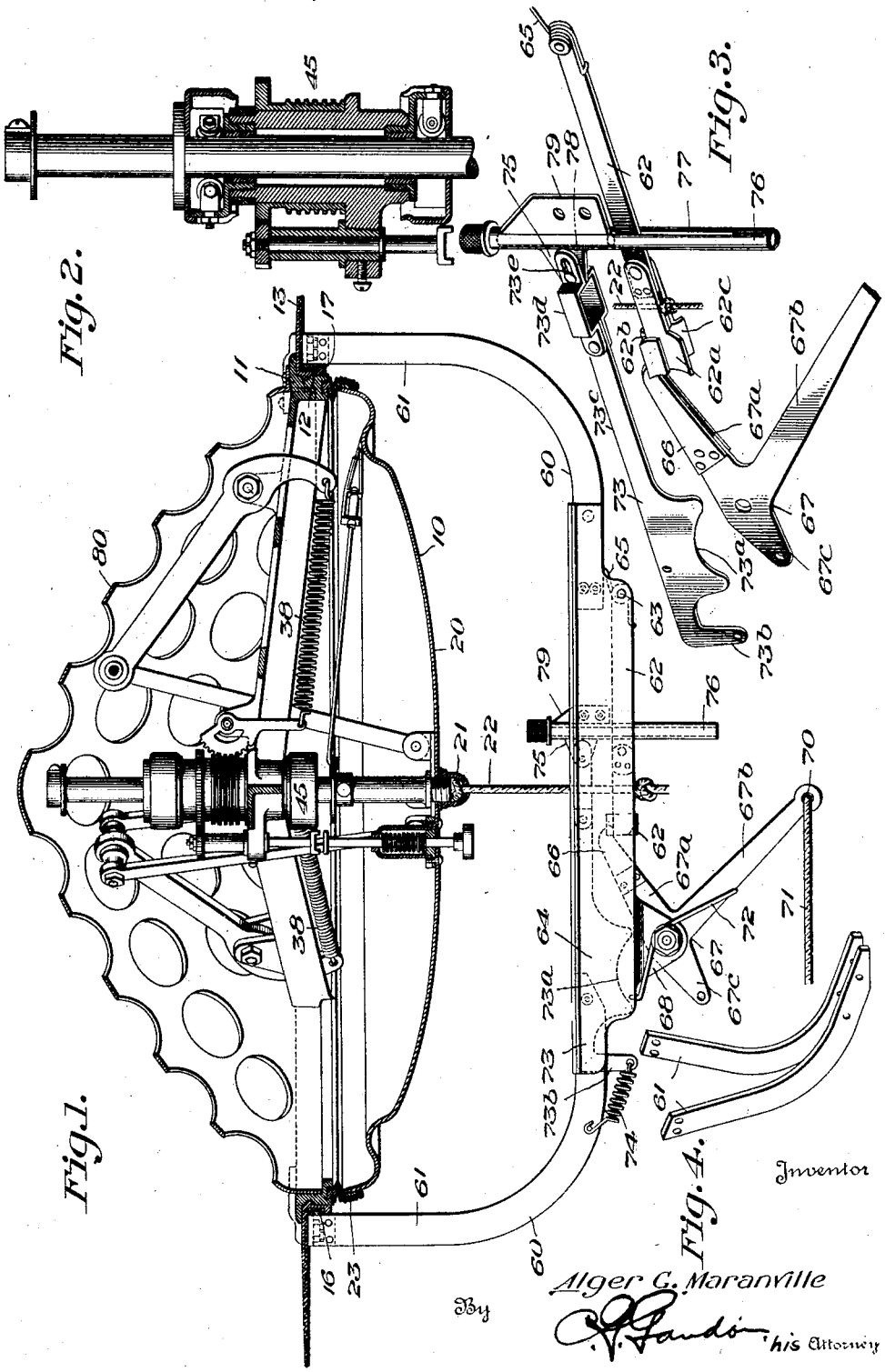
Inventor
Alger G. Maranville
By
his Attorney

UNITED STATES PATENT OFFICE.

ALGER G. MARANVILLE, OF AKRON, OHIO, ASSIGNOR TO THE GOODYEAR TIRE & RUBBER COMPANY, OF AKRON, OHIO, A CORPORATION OF OHIO.

VALVE-OPERATING MECHANISM.

1,386,579.  Specification of Letters Patent.  Patented Aug. 2, 1921.

Application filed October 16, 1919. Serial No. 331,200.

*To all whom it may concern:*

Be it known that I, ALGER G. MARANVILLE, a citizen of the United States, and resident of Akron, Ohio, have invented new and useful Improvements in Valve - Operating Mechanisms, of which the following is a specification.

My invention relates to a valve operating mechanism and has special reference to a device for opening and closing a gas valve of the type adapted for use on balloons, air ballonnets and the like.

Relief valves, such as are used on balloons, ballonnets, and the like, are automatically operated to maintain an equilibrium of pressure difference between that inside the envelop and that of the atmosphere, but it may happen that, for some reason or other, the automatic mechanism may stick or fail to function as it should, when it becomes imperative to operate the valve manually.

Hitherto it has been customary to provide mechanism for manually opening the valve, and other mechanism for positively closing it, thus necessitating the separate operation to two sets of elements.

With the above facts in mind it has been an object of my invention, first, to provide a manually operated device for controlling a valve and to be used also in case of emergency or whenever manual operation is desired, and second, to provide a device which, in one continued operation, will first open a valve, then allow its own loading devices to close it, and, as a further safeguard, to close the valve positively if necessary—in case it should tend to stick—by continuing the operative movement.

Other objects and advantages will appear as the description proceeds, and the invention will be more particularly defined in the claims hereto appended.

In the drawings, wherein I have illustrated a preferred form of my invention used in connection with an automatic valve for balloons:

Figure 1 is a vertical section of an automatic valve showing in elevation the automatic operating mechanism and the mechanism for manually operating the valve;

Fig. 2 is a detail in section of the valve mechanism;

Fig. 3 is a perspective view showing details of the manual operating mechanism; and Fig. 4 is a detail of the frame legs.

Referring to Fig. 1, the numeral 10 designates, as a whole, an automatic valve such as used on balloons or air ballonnets, or the like, for maintaining an equilibrium of pressure difference by compensating for any variations in atmospheric pressure, such variations being caused by change in altitude, temperature and other atmospheric conditions.

This valve 10 comprises a metal annulus 11 nicely fitted into a circular opening 12 formed by a ring-shaped gasket 13, preferably of rubber impregnated fabric, and said gasket is secured to said annulus and within a circular aperture of the balloon envelop, not shown, by a split band forming a clamping ring 16 which encircles a flange 17 on the gasket 13 and binds the gasket to the annulus 11, the edge of the balloon fabric being secured to the gasket by cementing or otherwise. This gasket 17 is especially adapted for setting a gas valve like 10 in an envelop, so that not only is a tight joint secured, but the valve may be readily and quickly inserted in place and removed, as is more fully described and set forth in my copending application Ser. No. 331,198, of even date, of which it forms the subject matter.

The disk-like dome 20, which is concavo-convex in form, is provided at its center with a lug 21 or the like, to which a cord or cable 22 may be fastened by making a knot in the end thereof, as shown, the cable being part of the manual operating mechanism, as will presently appear. I have found that a cable is of particular utility inasmuch as it prevents the accumulation of static electricity in either the valve or the support for the valve operating mechanism.

To the outer edge of the dome 20 is secured one section of the gasket 23, which gasket forms the subject matter of my copending application Ser. No. 331,199, of even date. Coöperating with the first part or section of the gasket is a second part or section the lip of which is adapted to contact with the corresponding lip of the other section secured to the annulus 11. In normal operation the valve 10 is automatically operated to hold the lips of the gasket members alone in contact, but when a predetermined pressure difference is attained, the lips separate to allow the flow of gas from the balloon.

The mechanism for effecting this operation consists of the dome or disk 20 exposed to atmospheric pressure on one side, and to that inside the gas envelop on the other. This dome is normally urged to its closed position by springs 38 and a system of levers, all of which is more fully described in my copending application Ser. No. 331,197, filed of even date.

I have also provided mechanism, designated as a whole by reference numeral 45, for suitably adjusting the tension of the springs 38, and this mechanism is also described in my said copending application Ser. No. 331,197, of even date.

The mechanism for manually operating the valve, and which particularly constitutes the subject matter of my present invention will now be described. A frame or yoke 60 having bifurcations or legs 61 which are bolted or otherwise secured to the ring 16 thereby giving the frame greater rigidity, spans the circle formed by the dome 20 and serves as a support for the manual operating mechanism. An arm 62 is pivoted at 63 between spaced sides 64 secured to or integral with the cross-portion of the yoke 60. The arm 62 normally held in inoperative position by a spring 65, is provided with a hole adapted to receive the cable 22, which may be provided with a knot or other enlargement to hold it in place, the other end of the cable 22 being fastened to the dome 20 as described above. The end 62$^a$ of the arm 62 is split, the inner faces of the split portions having shoulders 62$^b$ against which a pair of spring toes or leaves 66 are adapted to impinge, the split portion being divergently flared as at 62$^c$. These spring leaves 66 are slightly separated and are formed at the end of the medium length arm 67$^a$ of a bell-crank 67, the latter being pivotally supported between ears 68 rising from the spaced sides 64. The long arm 67$^b$ is provided at its end with an aperture 70 which receives a pull cord 71 and is normally held by a torsion spring 72, so that the spring leaves 66 are above the split end 62$^a$. The third arm, or heel 67$^c$, of the bell-crank 67, opposite the arm 67$^a$, is arranged to contact with a cam surface 73$^a$ formed on a bell-crank 73 also pivoted between the sides 64 of the frame 60 and normally held in inoperative position by a spring 74 fixed to the short arm 73$^b$ of the bell-crank 73 and to the frame. The long arm 73$^c$ of the bell-crank 73 has an aperture 73$^d$ through which cable 22 passes and is pivotally connected by a slot 73$^e$ at its end to an ear 75 outstanding from a hollow stem or plunger-like element 76, the latter having oppositely disposed slots 77 through which the arm 62 passes; the plunger-like element 76 being guided in its reciprocal movements by a tubular element 78 inside the same which is supported by a bracket 79 passing through one of the slots 77.

A guard 80 consisting of a conoidal casing, perforated to reduce weight, has been provided to protect the valve mechanism 10, and is secured to the annulus 11 by means of screws so as to inclose the valve 10.

From the above description the operation of the manual controlling device will be understood. This mechanism, as stated, is provided for use in emergency in case the automatic mechanism fails to operate as it should, or whenever manual control is desired. When the bell-crank 67 is operated by pulling on the cord 71 the spring toes 66 engage the shoulders 62$^b$ and move the arm 62 against the tension of spring 65, thereby pulling the cable 22 and opening the valve 10. The valve may be held open as long as desired and to any degree, and operated back and forth as desired. Upon continuing the pull on the cord 71, the toes 66 slip past the split end 62$^a$ of the arm 62 and the valve 10 should then close by the action of its springs 38. If, however, for some reason or other the valve 10 should stick or remain open, it can be positively closed by continued movement of the bell-crank 67, which swings the heel 67$^c$ in contact with the cam surface 73$^a$, thereby rocking the bell-crank 73 and moving the plunger 76 positively against the dome 20 of the valve 10. When the valve has thus been closed the parts may be restored to their normal position by releasing the pull on the cord 71 when the bell-crank 67 will spring back to its original position, the spring toes 66 being pressed together as they contact with the flared portions 62$^c$ so that they will readily pass between the split ends or leaves 62$^a$ at the end of arm 62 to their position above or inside the same, and they are then ready to move the arm 62 whenever the cord 71 is again pulled.

From the above description it will be apparent that I have provided a device for manually operating the normally automatic valve, of a character that is practically semi-automatic in its nature. That is to say, a long continued pull performs in turn three distinct operations; first to open the valve, second to release the valve and third, in case the valve does not seat by its own spring devices, to apply positive pressure thereto and thus force it to its seat. Further, by releasing the cord by which it is manipulated, the mechanism reassumes its normal position.

While, as pointed out, this manually operative device is not ordinarily continuously used if the automatic mechanism is functioning reliably, it will be understood that when the necessity for the use of the mechanism does arise it is highly imperative that it shall not only be absolutely dependable, but that its operation shall be simple and performed with as few movements of the operator's hand as possible. These requirements are admirably fulfilled by the mechanism described.

Although I have shown but one embodiment of my invention, which is the preferred one, it will be understood that changes additions, and modifications not inconsistent with the claims hereto appended, may be made, without in any sense departing from the essence of my invention.

What I claim is:

1. A control mechanism comprising, an element yieldably held in one position, a rocking lever, and manually controlled devices for successively operating the element in opposite directions by movement of the rocking lever in one direction.

2. A control mechanism comprising, an element yieldably held in one position, a rocking lever adapted for manual operation in one direction, and swingable devices for successively operating the element in opposite directions by such manual movement of said lever.

3. A control mechanism comprising, an element yieldably held in one position, a rocking member, means operated thereby for operating the valve in one direction, means actuated by said member for operating the element in the reverse direction, said means being successively actuated by movement of the member in the same direction, and means for manually operating the rocking member.

4. In combination with the envelop of a balloon, a valve controlling the flow of gaseous fluid therefrom, means for manually operating said valve, comprising a pivoted element, a connection between said element and said valve, a second pivoted element engaging said first named pivoted element and forming therewith an escapement mechanism, and means for operating said second pivoted element.

5. In combination with the envelop of a balloon, a valve controlling the flow of gaseous fluid therefrom, manually operated means for successively actuating said valve in reverse directions, comprising a lever, a connection between said lever and said valve, a second lever engaging said first named lever, and means for operating said second lever.

6. In combination with the envelop of a balloon, a loaded valve controlling the flow of gaseous fluid therefrom, means for manually opening said valve, comprising an arm, a connection between said arm and said valve, a lever, the end of which engages the end of said arm, and means for operating said lever to move said arm a predetermined distance, and upon continued movement in the same direction to release said arm, whereby said valve returns to its normal position by action of the load on said valve.

7. In combination with the envelop of a balloon, a loaded valve controlling the flow of gaseous fluid therefrom, means for manually opening said valve, comprising an arm having a bifurcated end, a connection between said arm and said valve, a lever spring held and having resilient leaves at its end, the resilient leaves being arranged to engage the bifurcated end of said arm, and means for operating said lever to move said arm a predetermined distance by engagement of said bifurcated end by said leaves, and upon continued movement of said lever in the same direction to release said arm, whereby said valve returns to its normal position by action of the load on said valve, and upon release of said operating means said resilient leaves pass between the bifurcations of said arm whereby said lever assumes its original inoperative position.

8. In combination with the envelop of a balloon, a loaded valve controlling the flow of gas therefrom, a yoke carried by said envelop, means supported by said yoke for manually operating said valve and comprising an arm connected to said valve, a lever for engaging said arm, a second arm, means carried by said second arm for engaging said valve, said second arm having a cam surface engaged by said lever, whereby said lever first engages said first named arm to open said valve, and upon continued movement engages said second arm to positively close said valve.

9. In a gas valve structure, valve operating mechanism comprising, a yoke associated with said valve, an arm supported by said yoke, a flexible connection between said arm and said valve, a lever supported by said yoke, the end of the lever arranged to engage the end of the arm, and means for operating said lever.

10. In a gas valve structure, valve operating mechanism comprising, a frame associated with said valve, a spring retained arm pivoted in said frame and connected to the valve, said arm having flared and shouldered bifurcations at its end, a spring held bell-crank pivoted in said frame and having two arms, one of which is bifurcated at its end, the bifurcations of which are arranged to engage the shouldered bifurcations of said first named arm, a third spring-held arm having a cam surface arranged to be engaged by an arm of the bell-crank, said third arm carrying a plunger arranged to impinge upon said valve, and means for operating said bell-crank, whereby upon operating said bell-crank by a continued movement in one direction, said valve is first opened, then released and finally positively acted on to close the same by impingement thereon of said plunger.

11. In a gas valve structure, valve operating mechanism comprising, a frame associated with said valve, a spring retained arm pivoted in said frame and connected to the valve, said arm having flared and shouldered bifurcations at its end, a spring held bell-crank pivoted in said frame and having two arms, one of which is unbifurcated and the other bifurcated to provide at its end separated spring leaves, said leaves being arranged to engage the shouldered bifurcations of said first named arm, a third spring held arm having a cam surface arranged to be engaged by the unbifurcated arm of the bell-crank, said third arm carrying a plunger arranged to impinge upon said valve, and means for operating said bell-crank whereby a continued movement in one direction first opens, then releases and finally positively closes said valve.

12. In a gas valve structure, valve operating mechanism comprising, a frame associated with said valve, a spring retained arm pivoted in said frame and connected to the valve, said arm having flared and shouldered bifurcations at its end, a spring held bell-crank pivoted in said frame and having two arms, one of which is bifurcated at its end, the bifurcations of which are arranged to engage the shouldered bifurcations of said first named arm, a third spring-held arm having a cam surface arranged to be engaged by an arm of the bell-crank, an element operated by said third arm and arranged to be impinged upon said valve, and means for operating said bell-crank, whereby upon operating said bell-crank by a continued movement in one direction, said valve is first opened, then released and finally acted on to close the same by impingement thereon of said element.

13. In a gas valve structure, valve operating mechanism comprising, a frame associated with said valve, a spring retained arm pivoted in said frame and connected to the valve, said arm having flared and shouldered bifurcations at its end, a spring held bell-crank pivoted in said frame and having two arms, one of which is unbifurcated and the other bifurcated to provide at its end separated spring leaves, said leaves being arranged to engage the shouldered bifurcations of said first named arm, a third spring held arm having a cam surface arranged to be engaged by the unbifurcated arm of the bell-crank, said third arm having means adapted to impinge upon said valve, and means for operating said bell-crank whereby a continued movement in one direction first opens, then releases and finally closes said valve.

14. The combination with a balloon envelop and a valve for controlling the flow of gaseous fluid therefrom of, a rocking element, and devices for successively operating the valve in opposite directions by movement of the rocking element in one direction.

15. The combination with a balloon envelop and a valve for controlling the flow of gaseous fluid therefrom of, a rocking element, means operated thereby for actuating the valve in one direction, means operated by said element for actuating the valve in a reverse direction, said means being successively operated by movement of the element in the same direction, and means for manually operating said rocking element.

16. The combination with a balloon envelop and a valve for controlling the flow of gaseous fluid therefrom of, a manually operated pivoted element, means actuated by movement of the element for operating the valve in one direction, and means actuated by continued movement of said element in the same direction to operate the valve in a reverse direction.

17. The combination with a balloon envelop and an automatically returned valve for controlling the flow of gaseous fluid therefrom of, a manually operated valve control mechanism comprising, a rocking element, and means actuated thereby for successively operating the valve in opposite directions by movement of the element in one direction, said means being operable independently of the automatic return means.

18. The combination with a balloon envelop and a valve for controlling the flow of gaseous fluid therefrom of, a manually operated valve control mechanism comprising, a pivoted member, means for operating the member, devices actuated through engagement with said member as it is moved in one direction to thereby successively actuate the valve in reverse directions, one of said devices comprising an escapement mechanism whereby it is released from engagement with the member before the other device is actuated.

19. A control mechanism comprising, an element yieldably held in one position, a spring returned operating arm provided with a cross head having a short cam arm and a relatively long arm provided with a bifurcated end portion formed of spring members, a spring returned lever pivoted in alinement with the cross head at a point remote therefrom and provided with a bifurcated end portion formed of spring members having oppositely flared edges between which the bifurcated end portion of the cross head is designed to pass with a wiping action, a second spring returned lever pivoted to normally lie in parallelism with the first lever, said second lever being provided adjacent one of its ends with a cam portion adapted to be engaged by the cam arm of the cross head and at its opposite end with a flange member arranged for sliding movement at right angles thereto, said flange member being slotted to straddle said first lever, means connecting the first lever with the element, and a pull cord at the end of the operating arm.

In witness whereof, I have hereunto signed my name in the presence of two subscribing witnesses.

ALGER G. MARANVILLE.

Witnesses:
J. E. KEATING,
PHILIP E. BARNES.